(12) United States Patent
Querre et al.

(10) Patent No.: US 11,863,862 B2
(45) Date of Patent: Jan. 2, 2024

(54) DEVICE AND METHOD FOR IMAGE DISPLAY

(71) Applicant: InterDigital CE Patent Holdings, SAS, Paris (FR)

(72) Inventors: Goulven Querre, Noyal sur Vilaine (FR); Thomas Morin, Rennes (FR); Karine Jegou, Chateaugiron (FR); Sebastien Fraleu, Noyal sur Vilaine (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 17/261,025

(22) PCT Filed: Jul. 17, 2019

(86) PCT No.: PCT/EP2019/068750
§ 371 (c)(1),
(2) Date: Jan. 17, 2021

(87) PCT Pub. No.: WO2020/016109
PCT Pub. Date: Jan. 23, 2020

(65) Prior Publication Data
US 2021/0352217 A1    Nov. 11, 2021

(30) Foreign Application Priority Data
Jul. 17, 2018   (EP) .................................. 18305969

(51) Int. Cl.
*H04N 5/232*     (2006.01)
*G06T 3/40*      (2006.01)
(Continued)

(52) U.S. Cl.
CPC ............. *H04N 23/632* (2023.01); *G06T 3/40* (2013.01); *G06T 3/60* (2013.01); *H04N 23/80* (2023.01)

(58) Field of Classification Search
CPC ......... H04N 5/232935; H04N 5/23229; H04N 23/632; H04N 23/80; G06T 3/40;
(Continued)

(56) References Cited

U.S. PATENT DOCUMENTS

| 8,414,387 B1 | 4/2013 | Paradise et al. |
| 2003/0016883 A1 | 1/2003 | Baron |

(Continued)

FOREIGN PATENT DOCUMENTS

| CN | 1581286 A | 2/2005 |
| CN | 102043576 A | 5/2011 |

(Continued)

OTHER PUBLICATIONS

English Translation for KR20070068590 entitled "User Interfacing Method for Portable Digital Apparatus and Portable Digital Apparatus Thereof".

(Continued)

*Primary Examiner* — Lin Ye
*Assistant Examiner* — John H Morehead, III
(74) *Attorney, Agent, or Firm* — CONDO ROCCIA KOPTIW LLP

(57) ABSTRACT

A display device (100) obtains (S210) an image, obtains (S220) a current measure of inclination of a screen (110) of the display device (100), rotates (S230) the image to compensate for the inclination to render the image parallel with the horizon, scales (S240) and displays (S250) the image entire and horizontally on the screen. The image can be part of a video for which other images are processed to be displayed horizontally. The image can be scaled to maximise (Continued)

the size of the image when displayed on the screen (110); this can be performed after a period of unchanged inclination.

12 Claims, 7 Drawing Sheets

(51) Int. Cl.
*G06T 3/60* (2006.01)
*H04N 23/63* (2023.01)
*H04N 23/80* (2023.01)

(58) Field of Classification Search
CPC .............. G06T 3/60; G09G 2340/0442; G09G 2340/0485; G09G 2340/0492; G09G 5/00; G06F 2200/1614; G06F 2200/1637
See application file for complete search history.

(56) References Cited

U.S. PATENT DOCUMENTS

| | | | |
|---|---|---|---|
| 2006/0197843 A1 | 9/2006 | Yoshimatsu | |
| 2008/0064439 A1 | 3/2008 | Na | |
| 2010/0064244 A1* | 3/2010 | Kilpatrick, II | H04M 1/0243 345/1.3 |
| 2010/0277506 A1* | 11/2010 | Yao | G06F 3/04845 345/650 |
| 2011/0096095 A1 | 4/2011 | Xu | |
| 2013/0120106 A1* | 5/2013 | Cauwels | A61B 5/14532 361/728 |
| 2013/0236093 A1* | 9/2013 | Gatt | G06F 3/0482 382/311 |
| 2014/0098027 A1* | 4/2014 | Sultenfuss | G06F 3/04886 345/173 |
| 2014/0211031 A1 | 7/2014 | Han | |
| 2016/0028960 A1* | 1/2016 | Ko | G06T 3/0006 348/333.12 |
| 2017/0085797 A1* | 3/2017 | Nichols | H04N 5/23296 |
| 2017/0236253 A1 | 8/2017 | Restrepo et al. | |
| 2017/0352188 A1 | 12/2017 | Levitt | |

FOREIGN PATENT DOCUMENTS

| | | |
|---|---|---|
| CN | 102479065 A | 5/2012 |
| EP | 1898388 A2 | 3/2008 |
| JP | 2004271802 A | 9/2004 |
| JP | 2006-129391 A | 5/2006 |
| JP | 2008281659 A | 11/2008 |
| JP | 2009-141868 A | 6/2009 |
| JP | 2010252239 A | 11/2010 |
| JP | 2014-099832 A | 5/2014 |
| KR | 10-2003-0000714 A | 1/2003 |
| KR | 20070068590 A | 7/2007 |
| KR | 10-2009-0021628 A | 3/2009 |
| KR | 10-2016-0011016 A | 1/2016 |
| WO | 2014/120805 A1 | 8/2014 |

OTHER PUBLICATIONS

English Language Transition, JP 2008281659 A, 39 pages.
"English Language Translation for Chinese Publication No. CN 1581286 A", Feb. 16, 2005, pp. 1-18.
"English Language Translation for Japanese Publication No. JP 2006129391 A", May 18, 2006, pp. 1-26.
"English Language Translation for Japanese Publication No. JP 2009141868 A", Jun. 25, 2009, pp. 1-8.
"English Language Translation for Japanese Publication No. JP 2014099832 A", May 29, 2014, pp. 1-24.
"English Language Translation for Korean Publication No. KR 20030000714 A", Jan. 6, 2003, pp. 1-7.
"English Language Translation for Korean Publication No. KR 20090021628 A", Mar. 4, 2009, pp. 1-25.
"English Language Translation for Korean Publication No. KR 20160011016 A", Jan. 29, 2016, pp. 1-17.
Wikipedia, "Steadicam", 2022, pp. 1-5.
English Language Machine Translation, Japanese Publication No. JP 2004271802 A, 27 pages.
English Language Machine Translation, Japanese Publication No. JP 2010252239 A, 16 pages.

* cited by examiner

DEVICE AND METHOD FOR IMAGE DISPLAY

CROSS REFERENCE TO RELATED APPLICATIONS

This application is the national stage entry under 35 U.S.C. § 371 of International Application PCT/US2019/068750, filed Jul. 11, 2019, which was published in accordance with PCT Article 21(2) on Jan. 23, 2020, in English, and which claims the benefit of European Patent Application No. 18305969.0, filed Jul. 17, 2018.

TECHNICAL FIELD

The present disclosure relates generally to display devices and in particular to display on rotatable displays.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Watching video on mobile display devices such as smartphones and tablets is widespread. While the mobility inherent in such devices is a great advantage, it at the same time has at least one disadvantage: where non-mobile devices are relatively easy to arrange so that the displayed image is horizontal, this is not always the case for mobile devices.

When using a mobile device on an uneven or inclined surface, the display of the mobile device will not be horizontal unless the user takes steps to make the display horizontal, e.g. by propping up the mobile device. If the display is not horizontal, the displayed image will not be horizontal either. This also applies, to some extent, in a vehicle subject to non-horizontal movement (such as may be experienced on a boat or in a car on a bumpy road).

The human eye easily notices when a displayed image is not horizontal, which may create confusion and annoy a viewer.

JP 2008281659 describes a game console that can be used for car games. The console is generally circular and functions both as a driving wheel and a screen displaying the route. When the console is rotated (for turning the car), the displayed circular image is rotated in the opposite direction so as to make the displayed image horizontal. However, the solution only works for circular screens.

It will thus be appreciated that there is a desire for a solution that addresses at least some of the shortcomings of mobile display devices. The present principles provide such a solution.

SUMMARY OF DISCLOSURE

In a first aspect, the present principles are directed to a display device comprising a screen, an inclinometer configured to measure an inclination of the screen with respect to a horizon, and at least one hardware processor configured to obtain an image, rotate the image to compensate for the inclination to render the image parallel with the horizon, scale the image so that the image will be displayed on the screen, and display the image.

In a second aspect, the present principles are directed to a method in a display device for displaying an image. At least one hardware processor obtains an image and a current measure of inclination of a screen of the display device, rotates the image to compensate for the inclination to render the image parallel with the horizon, scales the image so that the image will be displayed entire and horizontally on the screen, and displays the image so that the image is displayed on the screen.

In a third aspect, the present principles are directed to a display device comprising a screen, an inclinometer configured to measure an inclination of the screen with respect to a horizon, and at least one hardware processor configured to obtain an overscanned image comprising a central part and edges, wherein the edges are not displayed on the screen in a horizontal position, rotate the overscanned image to compensate for the inclination to render the image parallel with the horizon, and display a screen-shaped part of the overscanned image, the screen-shaped part being rotated with respect of the overscanned image according to the inclination of the screen.

In a fourth aspect, the present principles are directed to a method in a display device for displaying an image. At least one hardware processor obtains an image and a current measure of inclination of a screen of the display device, rotates the image to compensate for the inclination to render the image parallel with the horizon, and displays on a screen a screen-shaped part of the overscanned image, the screen-shaped part being rotated with respect of the overscanned image according to the inclination of the screen.

In a fifth aspect, the present principles are directed to a non-transitory computer readable medium storing program code instructions that, when executed by a processor, implement the steps of a method according to the second aspect.

In a sixth aspect, the present principles are directed to an apparatus comprising an image capture device configured to capture an image, a sensor configured to measure a roll angle of the apparatus, a screen having a shape and being configured to render images, and a processor configured to extract a part of the image captured, the part having the shape of the screen and being counter-inclined to the roll angle to be parallel with a horizon, and display, on the screen, the part parallel with the horizon.

BRIEF DESCRIPTION OF DRAWINGS

Features of the present principles will now be described, by way of non-limiting example, with reference to the accompanying drawings, in which.

DESCRIPTION OF EMBODIMENTS

Figure 1:
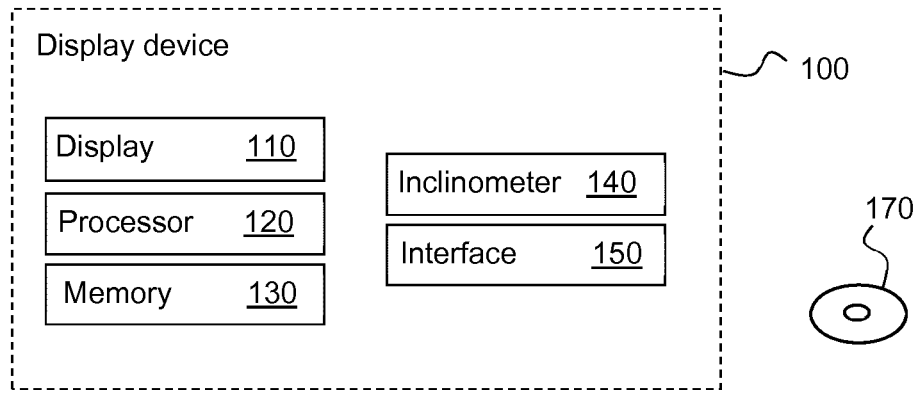
FIG. 1 illustrates a mobile display device according to an embodiment of the present principles.

FIG. 1 illustrates a mobile display device 100 according to an embodiment of the present principles. The mobile display device 100 can for example be a Smartphone or a tablet. The mobile display device 100 includes a preferably at least essentially rectangular (or square) screen 110 but other shapes are also possible as will be showed hereinafter, at least one hardware processor ("processor") 120, memory 130, an inclinometer (also called tilt sensor) 140 and an interface 150. It will be appreciated that parts of the mobile display device 100 that are not useful for understanding the present principles are not illustrated for the sake of clarity.

The screen 110 can be any suitable conventional display configured to display images. The screen 110 is considered horizontal when a main axis is parallel with the horizon; for example, for a rectangular screen, this is the case when one of its short edges or when one of its long edges are parallel with the horizon.

The memory 130 can be any suitable conventional memory configured to content including at least one image to display on the screen 110. The memory 130 can be implemented as a plurality of physical memory circuits and can further be a non-transitory storage medium storing software program instructions including instructions that, when executed by the processor 120, performs the method according to the present principles illustrated in FIG. 2.

The inclinometer 140 can be any suitable conventional inclinometer configured to measure an inclination (i.e. rotation) relative to the horizontal (or similar) and deliver a measure of inclination to the processor 120. The inclinometer 140 can be implemented using for example an accelerometer, a gyroscope or a magnetometer (possibly working with a positioning system).

The interface 150 can be any suitable conventional interface configured for communication with other device, for example in order to obtain content including at least one image to display on the screen 110. In one embodiment, the content is video content.

The processor 120 is configured to receive the measure of inclination from the inclinometer and to process at least one image to display by compensating for the inclination by rotating at least one image by the same amount in the opposite direction, thereby obtaining an image that is horizontal when displayed. The processor 120 is further configured to scale the image. The scaling can for example be performed before rotation to obtain an image that will fit the screen without being cropped no matter the inclination of the screen. The scaling can also be performed after rotation, on the horizontal image to obtain a image having a specific size. A first example of a specific size is the one already described: a horizontal image that will fit on the screen no matter its rotation. A second example of a specific size is the largest image that will fit on the screen even after rotation up to a given amount from the current inclination of the screen.

The given amount can be zero, which means that the image is as large as possible on the screen without being resized. The processor can be configured to perform the scaling after a preset period of stability, i.e. a period of essentially identical inclination, which can be measured by the processor.

Non-transitory storage media 170 stores instructions that, when executed by processor 120, perform the functions further described hereinafter with reference to FIG. 2.

Figure 2:
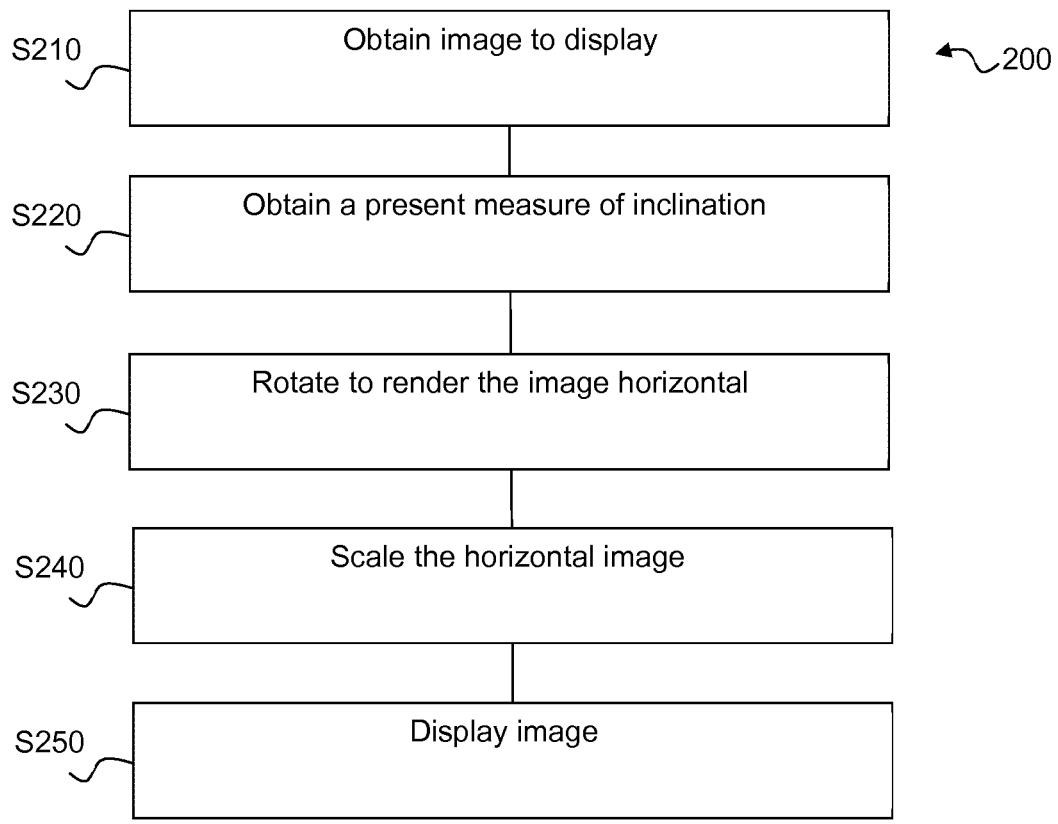
FIG. 2 illustrates a flowchart of a method according to an embodiment of the present principles.

FIG. 2 illustrates a method 200 according to an embodiment of the present principles. In step S210, the processor 120 obtains an image to display on the screen 110. The image can be received from the memory 130 or from the interface 150, possibly passing via the memory 130.

In step S220, the processor 120 receives a current measure of inclination from the inclinometer 140. The reception can be in response to a request from the processor 120, a scheduled delivery from the inclinometer 140, or a change in the inclination measured by the inclinometer 140.

In step S230, the processor 120 processes the image by rotating the image by the same amount in the opposite direction of the measure of inclination, thus rendering the image horizontal.

In step S240, the processor 120 scales the horizontal image to obtain a specific size as already discussed. This can be to maximise the size of the image on the display without being cropped when displayed, which for example for a rectangular display will happen when at least two (diagonally opposed) corners of the scaled horizontal image touches two opposing edges of the display.

The scaling can be performed in different ways. A first way is using lookup tables (possibly stored in the memory 130) with the aspect ratios of the screen 110 and the image and the inclination angle as input to provide a size of the image. A second way, suitable for a rectangular display for example, is to calculate the length of a diagonal rotated by the angle of the inclination from one edge of the screen to the opposite edge and translate this diagonal length, using the aspect ratio of the image, to a width and a height, from which the scaling factor can be obtained. For a complex form of the screen, the computation could be more complex but this complexity does not impact the rendering effect.

As mentioned, the scaling can occur after a period of stability, for example a preset period of time without rotation or for instance 2 times the larger periodicity of the 10 last oscillations. In this case, step S240 can occur after step S250. In case the scaling to fit occurs after the displaying, the image can nevertheless be pre-scaled in step S240 to have a size that will fit on the screen no matter the inclination or to fit the screen if inclined a given amount from the current inclination (such as ±5°).

Further, scaling can also take place before the rotation, for example to obtain a size that will enable the image to fit on the screen no matter the rotation.

In addition, the processor 120 can determine the position of the image on the screen 110 during step S240. The position can be in the centre of the display.

In step S250, the rotated (and possibly scaled) image is displayed on the screen 110. The image is preferably displayed centered on the screen 110, but it can also be displayed in a non-centered position.å

Figure 3:
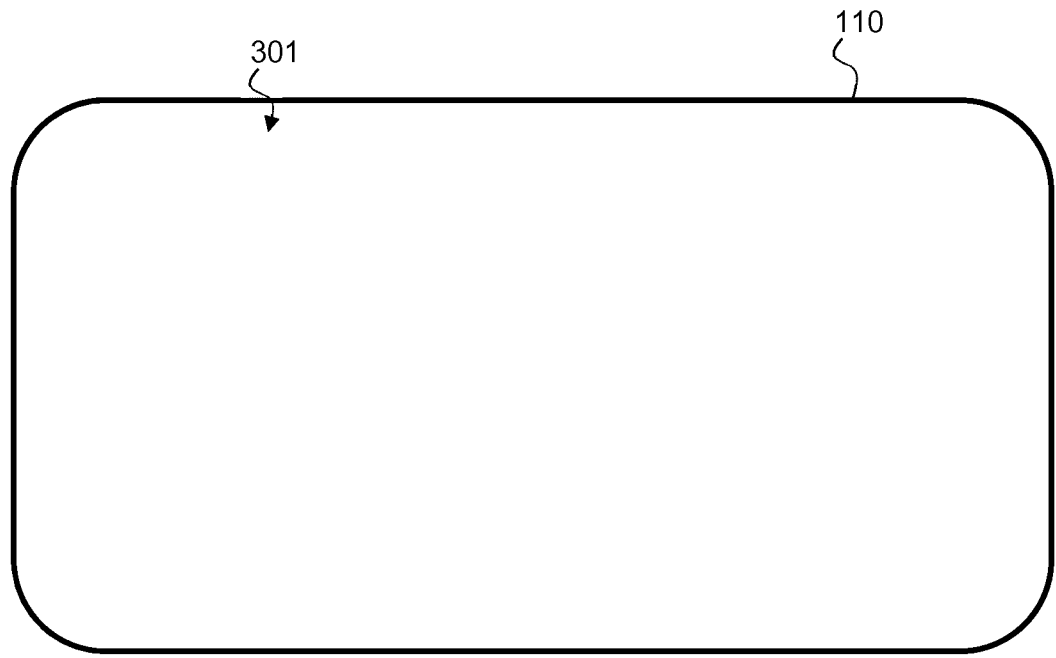
FIG. 3 illustrates an example of display of an image on a horizontal display device.

FIG. 3 illustrates an example of display of an image on a horizontal display. The screen 110 is horizontal and the image 301 is also horizontal. The image 301 is illustrated as filling the entire screen 110, but it should be understood that this may not always be the case, such as for example when the aspect ratio of the image and the screen are not the same.

Figure 4:
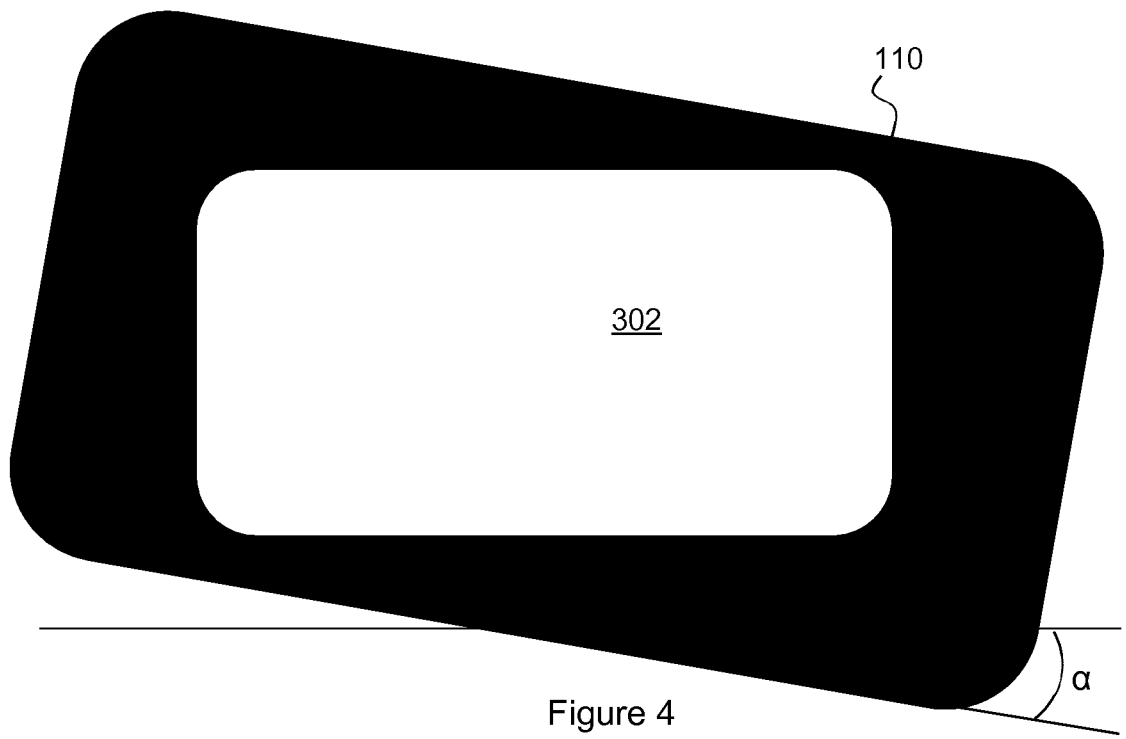
FIG. 4 illustrates a first example of display of an image on an inclined display device.

FIG. 4 illustrates a first example of display of an image on an inclined display. In this Figure, the screen 110 is inclined by an angle α and the image 302 is rotated the same amount in the opposite direction so that it is horizontal (which means that it also is rotated by an angle α with regard to the long edges of the screen 110). As can be seen, the rotated image 302 does not have its maximum size (i.e. it can be bigger without being resized).

Figure 5:
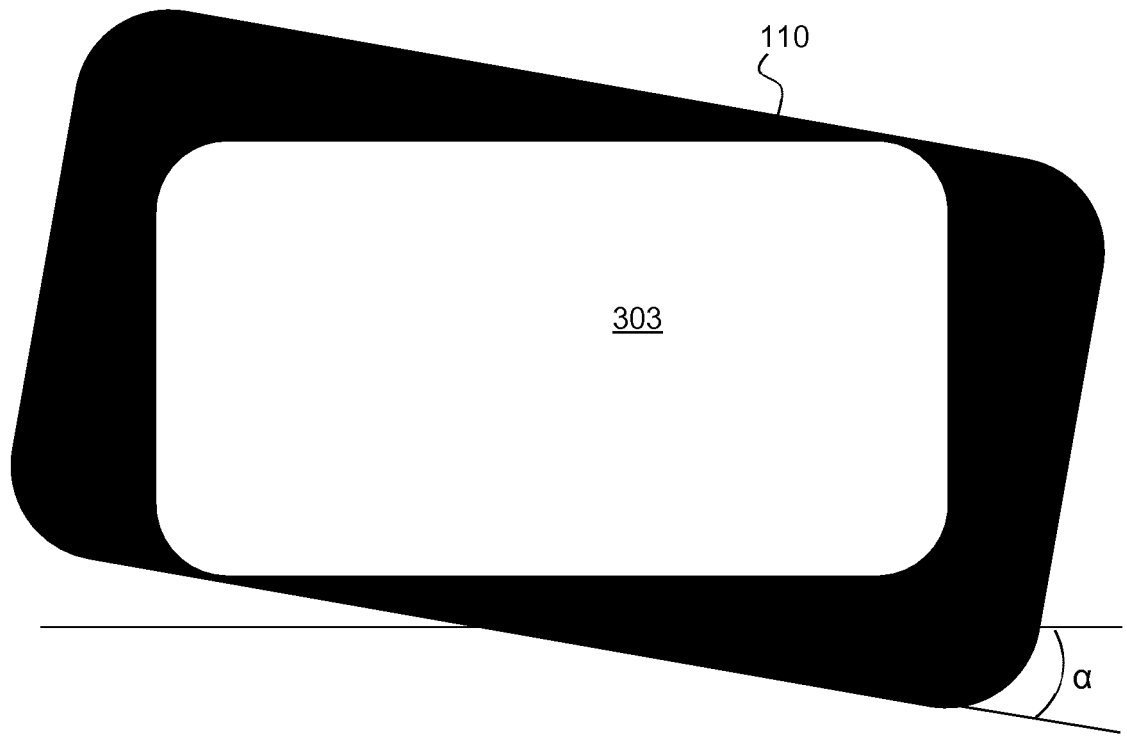
FIG. 5 illustrates a second example of display of an image on an inclined display device.

FIG. 5 illustrates a second example of display of an image on an inclined display. In this Figure, the screen 110 is again inclined a degrees and the image 303 is again rotated to render it horizontal. As can be seen, the rotated image 303 has its maximum size (i.e. it is as large as it can be without extending beyond the display and thus being resized).

It will be appreciated that the present principles also function at sea, which means that the content can be displayed horizontally even when the craft on which the mobile display device 100 is located rolls. This can help passengers feel less seasick as the mobile display device 100 can present an image that is steady with respect to the horizon.

The present principles also can also accommodate overscan, i.e. that the received image includes parts along the edges that are not displayed on the screen. In a first overscan variant, only the image parts that are actually displayed to the user are displayed in the counterrotated and resized images. In a second overscan version, when the screen is rotated, the image is rotated in the opposite direction. Then, as long as the rotation is small, the image is not resized, but parts of the image in the "overscan part" are displayed. This is possibly as long as there are such parts to display, but once further rotation would go outside the image, the image is resized to fit, as previously described.

Figure 6:
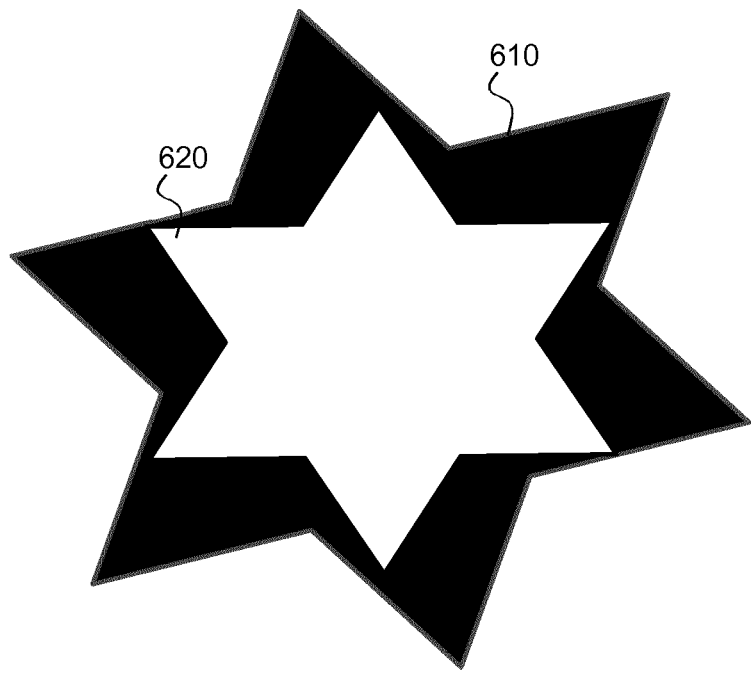
FIG. 6 illustrates an example of display on a non-rectangular screen.

FIG. 6 illustrates an example of display on a non-rectangular screen. The example shows a hexagrammatic screen 610 that has been rotated from the horizontal and a hexagrammatic image 620 that has been counterrotated and scaled so that it is displayed horizontal. The skilled person will appreciate that the present principles apply to all non-circular screens.

It will also be appreciated that the present principles readily extend to projectors that display images on surfaces.

It will thus be appreciated that the present principles can provide a horizontal image on a display device that is not horizontal. Further, this can be achieved even when the display device moves, i.e. when its inclination varies.

In an alternate embodiment, the present disclosure is directed to digital image capture apparatuses, such as cameras, both still and video, possibly included in other devices such as smartphones and tablets.

While it is common for digital image capture apparatuses to indicate its inclination in order to aid the user to take pictures parallel with or perpendicular to the horizon, such an indication is not always activated by the user and even when it is, a small inclination (say 1-2°) may not be indicated by the digital image capture apparatuses but still be noticeable in the captured image.

A solution to this is to edit the captured image afterwards by rotating it, but it is not always easy to find the correct rotation angle and the rotation causes loss of parts of the picture if the standard picture format ratio is kept.

Figure 7:
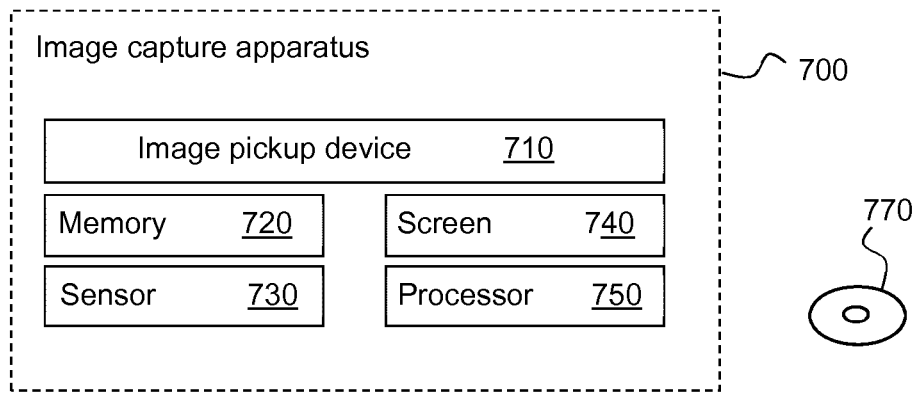
FIG. 7 illustrates an image capture apparatus according to an alternative embodiment.

FIG. 7 illustrates a digital image capture apparatus (hereinafter "apparatus") according to an alternative embodiment of the present principles. The apparatus 700 includes an electronic image pickup device 710, such as a sensor, configured to capture light to be transformed into electric signals Any suitable conventional image pickup device, such as those in present conventional digital cameras can be used in the apparatus. As is well known, such image pickup devices typically include a Charge-Coupled Device (CCD) or a Complementary Metal-Oxide-Semiconductor (CMOS) digital image sensor. As such image pickup devices are well known in the art, they will not be further described; it is sufficient to know that they deliver a signal representative of a captured image to at least one of memory 720, a screen 740, a processor 750.

Figure 9:
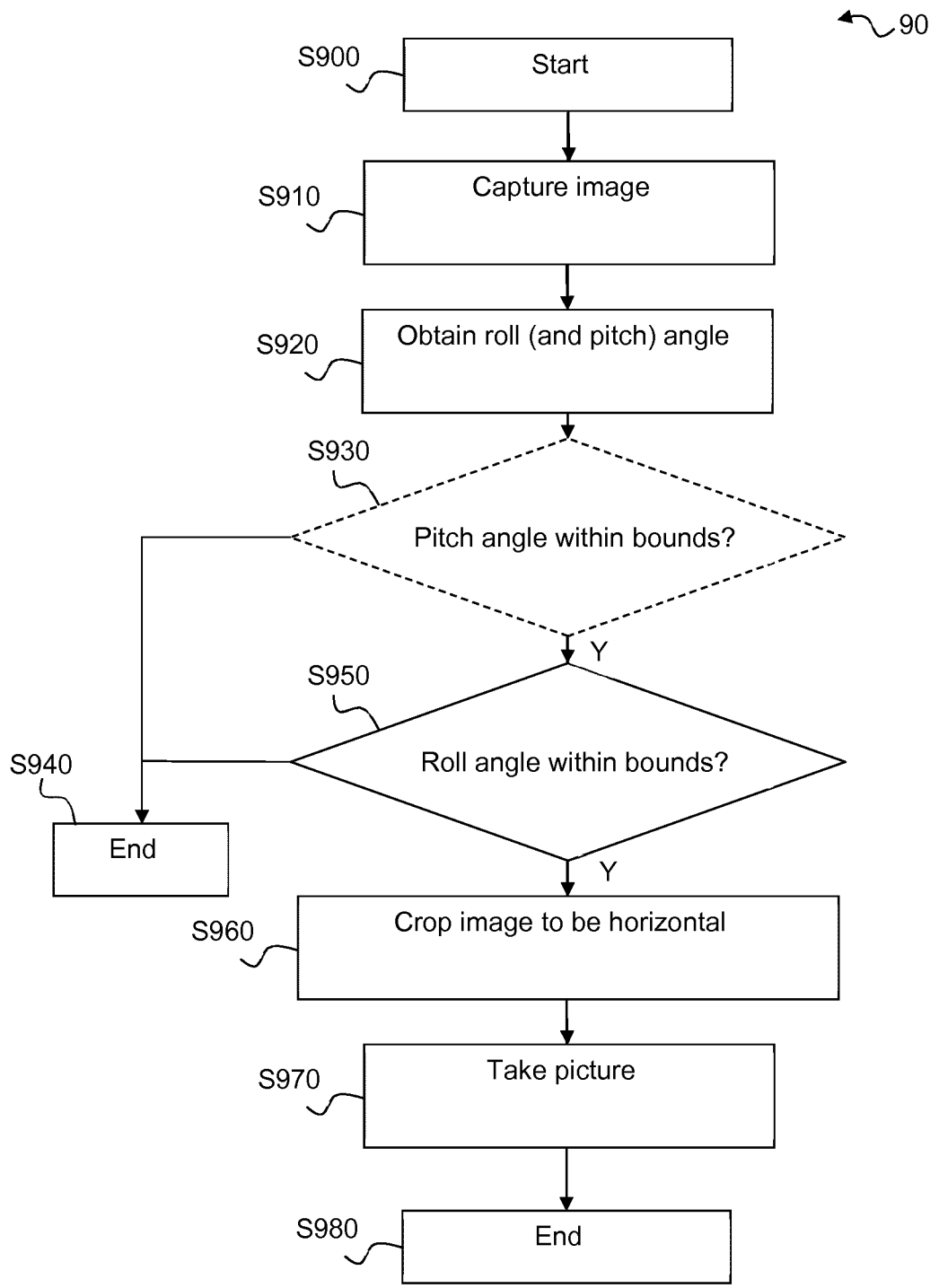
FIG. 9 illustrates a method according to an alternative embodiment.

The memory 720, which may be non-transitory and which may be made up of a plurality of physical memory circuits, is configured to store captured images (which then are "stored images") and software instructions that when executed by the processor 750 perform the method illustrated in FIG. 9. The apparatus 700 further includes the screen 740 and at least one hardware processor 750 (hereinafter "processor"). The screen 740, which can be any suitable conventional screen such as a screen used in a conventional digital camera, smartphone or tablet, is configured to display images, such as captured images or processed images based on captured images, to a user.

The processor 750 can be any suitable processor configured to perform software instructions, for example stored in the memory 720, to perform the method illustrated in FIG. 9, as will be described hereinafter.

Figure 8:
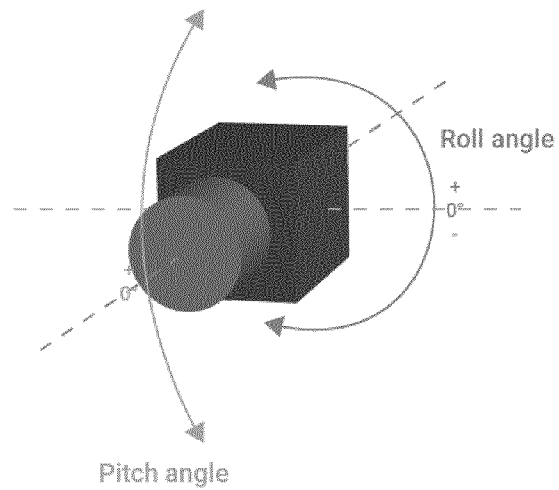
FIG. 8 illustrates pitch and roll angles of an image capture apparatus.

The apparatus 700 also includes a sensor 730, such as a gyroscopic sensor, configured to measure at least the inclination (i.e. the roll angle) of the apparatus 700; the sensor can further be configured to measure a pitch angle of the apparatus 700; the pitch and roll angles are illustrated in FIG. 8. The measured angles can be provided to the processor 750.

Non-transitory storage media 770 stores instructions that, when executed by processor 750, perform the functions further described hereinafter with reference to FIG. 8.

FIG. 8 illustrates pitch angle and roll angle of an apparatus. As can be seen, the roll angle can be explained as an angle in a plane perpendicular to the axis that passes through an objective of the apparatus. The pitch angle can be explained as the elevation of the axis through the objective with reference to the horizon (i.e. is it pointing up or down?).

FIG. 9 illustrates a method 90 according to an alternative embodiment of the disclosure. The method starts in step S900. In step S910, the image pickup device 710 of the apparatus 700 captures an image and provides an electric signal corresponding to the captured image to the screen 740. The electric signal can also be provided to the processor 750. In a digital camera, the capture is generally continuous until reception of instructions directly or indirectly from a user to take a picture, i.e. to store the electric signal (that may be processed by the processor 750 before being sent to the memory 720 for storage).

In step S920, the processor 750 obtains at least a current roll angle of the apparatus 700 from the sensor 730; the processor 750 can also obtain the pitch angle. It will be appreciated that the sensor 730 can provide the pitch angle and the roll angle essentially continuously to the processor 750.

In step S930, the processor 750 verifies, according to different embodiments, if the obtained pitch angle is greater than a "pitch down" limit, smaller than a "pitch up" limit or greater than the "pitch down" limit and smaller than the "pitch up" limit. If the pitch angle does not fulfil the condition of the embodiment, the method ends in step S940 (after which the user may still continue taking pictures without aid of the present method). In other words, the processor 750 verifies if the pitch angle is within a sector around the horizontal. Otherwise, the method continues with step S950.

It is noted that the angle corresponding to the pitch up limit may be different from the angle corresponding to the pitch down limit counted from the horizontal.

A reason for verifying these condition or conditions is that it can be assumed that the user aims for a special effect for which the correction described hereinafter should not be used. This may for example be the case when the user takes a picture of a flower from above (and the pitch angle thus outside pitch down limit).

In step S950, the processor 750 verifies if the obtained roll angle is outside a roll limit. It is noted that the roll limit may be different between the clockwise and the counterclockwise direction. In case the roll angle is greater than the roll limit, the method ends in step S940; otherwise the method continues in step S960.

The processor 750 can also verify if the roll angle is equal to 0° (or lower than an acceptable roll angle). If this is the case, the method can end in step S940 since the captured image already is horizontal (or judged to be essentially horizontal).

A reason for the verification of the roll angle is essentially the same as for the verification of the pitch angle; it is assumed that a large roll angle is intended by the user and that no correction should be made to the captured image.

The different limits can be stored in the memory 720, but they may also be included in the software instructions executed by the processor 750. In one embodiment, the limits can be set by the user. The user can also disable the verification of the pitch angle, for example by setting the respective limits to −90° and +90° (so that the pitch angle always falls within the sector).

In step S960, the processor 750 processes the captured image by cropping parts of the captured image. The captured image is cropped so that the edges of the resulting processed image are respectively parallel with and perpendicular to the horizon; this applies in particular for a square or rectangular captured image. Furthermore, the captured image can also be cropped so that the processed image respects the aspect ratio of the screen 720. It is noted that in case the screen 720 does not have the same aspect ratio as the images stored by the apparatus, the captured image can be cropped to respect the aspect ratio of the stored images.

It is noted that no cropping is made if the roll angle is 0° or sufficiently small so that the captured image is horizontal or essentially horizontal.

It is also noted that the processor 750 can process the electric signal that is (then) rendered on the screen, but it is also possible at this point for the processor 750 to simply overlay the image by a sections of screen background colour (or other colour) to make it appear as though the image has been cropped, while the actual cropping can occur once the picture has been taken in step S970.

The processor 750 uses the obtained roll angle to process the captured image. The skilled person will understand the processing of the captured image can be said to compensate for the "non-horizontality" apparatus (and thus of the captured image) so that the processed image is horizontal, but cropped.

The resulting image can also be displayed on the screen 720 to inform the user of what taken image will be, hence enabling the user to for example adjust the inclination of the apparatus or give instructions to take a picture.

It is noted that the steps can be performed continuously and also in parallel until the user gives the instructions to take a picture.

In step S970, the apparatus 700 receives instructions to take a picture and takes the picture. As already discussed, the picture can be cropped for real if this has not already been done. The processor 750 then stores the processed image in the memory 720 for storage. Before storing the processed image, the processor 750 can resize the processed image so that it, when retrieved and rendered has the same size as a 'normal' image, i.e. one that has not been cropped. The processor can also store the originally captured image, i.e. without processing according to the present method, preferably along with the processed image.

The method then ends in step S980.

Figure 10:
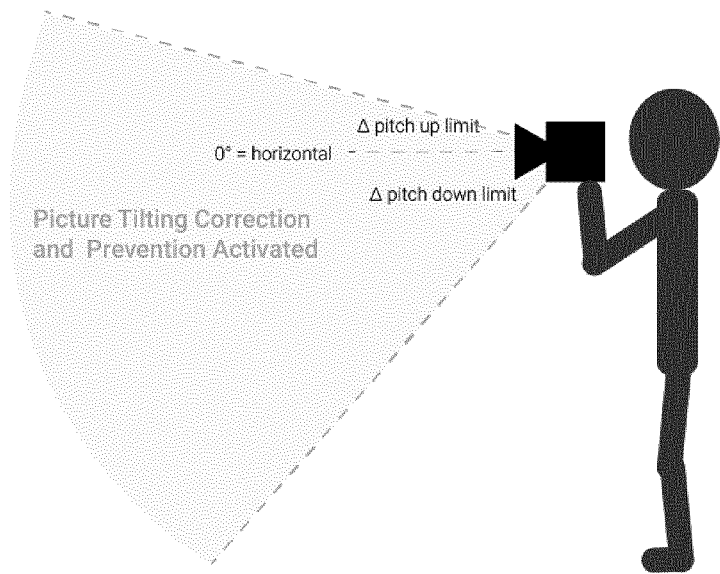
FIG. 10 illustrates pitch angles and limits used in an embodiment.

FIG. 10 illustrates pitch angles and limits used in an embodiment. The figure shows the horizontal line (pitch angle=0°) for an apparatus, a pitch up limit and a pitch down limit, as well as a sector that corresponds to "within bounds" in step S950.

Figure 11:
FIG. 11 illustrates an image capture apparatus with roll angle=0° capturing an image.

FIG. 11 illustrates an image capture apparatus with roll angle=0° capturing an image. As can be seen, since the roll angle is 0°, the captured image can be captured as is since it already horizontal; no cropping (step S960) will be performed. The optional icon in the upper righthand corner of the screen indicates that tilt compensation is enabled, i.e. that the apparatus will crop the image to compensate for the roll angle other than 0° (or essentially 0°).

Figure 12:
FIG. 12 illustrates an image capture apparatus with roll angle≠0° according to an embodiment.

FIG. 12 illustrates an image capture apparatus with roll angle≠0° according to an embodiment. As can be seen, the apparatus is tilted, the icon indicates that tilt compensation is enabled, and the captured image is indeed cropped so that the resulting image is horizontal.

Figure 13:
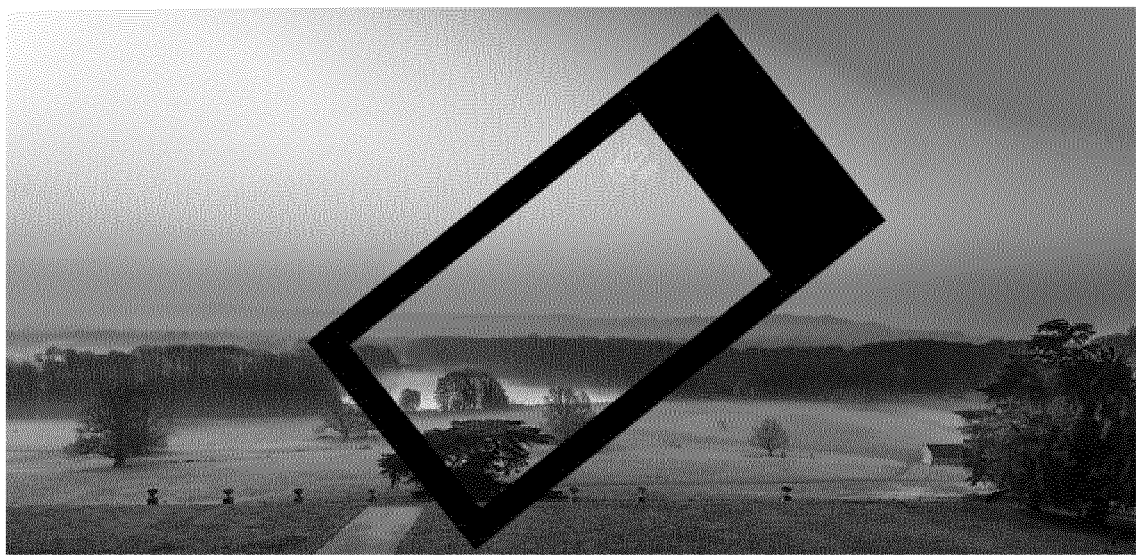
FIG. 13 illustrates an image capture apparatus with roll angle without roll angle bounds according to an embodiment.

FIG. 13 illustrates an image capture apparatus with roll angle without roll angle bounds according to an embodiment. As can be seen, the apparatus is at an important roll angle, the icon indicates that tilt compensation is not enabled and the captured image is not cropped.

As can be seen, the present apparatus and method can ensure horizontality in captures, which can be automatically under certain conditions and can provide an indication to the user about image areas that will be lost.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The invention claimed is:

1. An apparatus comprising:
an image capture for capturing an image;
a sensor for measuring a roll angle of the apparatus;
a screen for rendering images and having a shape; and
a processor for extracting a part of the image captured, only if the roll angle is within roll limit bounds, the part having the shape of the screen and being counter-inclined to the roll angle to be parallel with a horizon, and for displaying, on the screen, the part of the image that is parallel with the horizon.

2. The apparatus of claim 1, wherein the sensor is further for measuring a pitch angle of the apparatus and wherein the processor is further for extracting the part only in case the pitch angle is within pitch angle bounds.

3. The apparatus of claim 1, further comprising memory for storing the part of the image, and wherein the processor is further for resizing the part of the image before storage in the memory.

4. A method, implemented in an apparatus comprising a screen having a shape and being configured to render images, the method comprising:
capturing an image;
measuring a roll angle of the apparatus;
only if the roll angle is within roll limit bounds,
extracting a part of the image captured, the part having the shape of the screen and being counter-inclined to the roll angle to be parallel with a horizon; and
displaying, on the screen, the part of the image that is parallel with the horizon.

5. The method of claim 4, further comprising:
measuring a pitch angle of the apparatus; and
extracting the part only in case the pitch angle is within pitch angle bounds.

6. The method of claim 4, further comprising:
resizing the part of the image; and
storing the part of the resized image.

7. A non-transitory computer readable medium storing program code instructions that, when executed by a processor, implement the steps of the method according to claim 4.

8. An apparatus comprising:
an image capture for capturing an image;
a sensor for measuring a roll angle of the apparatus and a pitch angle of the apparatus;
a screen for rendering images and having a shape; and
a processor for extracting a part of the image captured, if the pitch angle is within pitch angle bounds, the part having the shape of the screen and being counter-inclined to the roll angle to be parallel with a horizon, and for displaying, on the screen, the part of the image that is parallel with the horizon.

9. The apparatus of claim 8, further comprising memory for storing the part of the image, and wherein the processor is further for resizing the part of the image before storage in the memory.

10. A method, implemented in an apparatus comprising a screen having a shape and being configured to render images, the method comprising:
capturing an image;
measuring a roll angle of the apparatus;
measuring a pitch angle of the apparatus;
if the pitch angle is within pitch angle bounds, extracting a part of the image captured, the part having the shape of the screen and being counter-inclined to the roll angle to be parallel with a horizon; and
displaying, on the screen, the part of the image that is parallel with the horizon.

11. The method of claim 10, further comprising:
resizing the part of the image; and
storing the part of the resized image.

12. A non-transitory computer readable medium storing program code instructions that, when executed by a processor, implement the steps of the method according to claim 10.

* * * * *